United States Patent
Goldberg

(10) Patent No.: US 7,381,962 B2
(45) Date of Patent: Jun. 3, 2008

(54) METHOD AND SYSTEM FOR DETECTING SUBSTANCES, SUCH AS SPECIAL NUCLEAR MATERIALS

(75) Inventor: Mark Goldberg, Yavne (IL)

(73) Assignee: Soreq Nuclear Research Center, Nahal Soreq (IL)

( * ) Notice: Subject to any disclaimer, the term of this patent is extended or adjusted under 35 U.S.C. 154(b) by 0 days.

(21) Appl. No.: 10/582,763

(22) PCT Filed: Dec. 14, 2004

(86) PCT No.: PCT/IL2004/001128

§ 371 (c)(1),
(2), (4) Date: Jun. 13, 2006

(87) PCT Pub. No.: WO2005/059594

PCT Pub. Date: Jun. 30, 2005

(65) Prior Publication Data

US 2007/0102646 A1    May 10, 2007

(30) Foreign Application Priority Data

Dec. 16, 2003  (IL) .................................... 159406

(51) Int. Cl.
  *G01N 23/02*  (2006.01)
  *G01T 1/16*  (2006.01)
(52) U.S. Cl. ..................... 250/370.09; 378/5
(58) Field of Classification Search ........... 250/370.09; 378/5, 120
See application file for complete search history.

(56) References Cited

U.S. PATENT DOCUMENTS 4,163,901 A * 8/1979 Azam et al. ................. 378/105

(Continued)

FOREIGN PATENT DOCUMENTS

JP       08 178873       11/1996

(Continued)

OTHER PUBLICATIONS

Rizescu C et al, "Determination of local density and effective atomic number by the dual-energy computerized tomography method with the <192>Ir radio-isotope", Nuclear Instruments & Methods in Physics Research, Section A: Accelerators, Spectrometers, Detectors and Associated Equipment, North Holland Publishing Co., Amsterdam, NL, vol. 465, No. 2-3, Jun. 11, 2001, pp. 584-599, XP004245367, ISSN: 0168-9002.

*Primary Examiner*—John R. Lee
(74) *Attorney, Agent, or Firm*—Dekel Patent Ltd.; David Klein

(57) ABSTRACT

A system for detecting substances, the system including a dual-energy radiography (DER) system including a gamma-ray radiation source, including a beam accelerator and a target to which the accelerator sends a beam thereby producing gamma rays, and a plurality of gamma ray detectors positioned to detect gamma rays that pass from the gamma-ray radiation source through an object to be inspected, wherein the DER system is adapted to indicate a presence of a high-Z substance, by detecting a difference in a transmission attenuation characteristic of the high-Z substance as opposed to low-Z and medium-Z substances and differentiating among high-Z substances according to their density, as determined from a plurality of radiographic views.

20 Claims, 6 Drawing Sheets

U.S. PATENT DOCUMENTS 4,941,162 A * 7/1990 Vartsky et al. ............... 378/3
5,040,200 A    8/1991 Ettinger et al.
5,251,240 A * 10/1993 Grodzins .................. 376/157
5,729,582 A *  3/1998 Ham et al. ................. 378/89
5,784,430 A *  7/1998 Sredniawski ............... 378/57
5,838,758 A * 11/1998 Krug et al. ................ 378/53
6,069,362 A *  5/2000 Giakos ..................... 250/394
6,316,773 B1 * 11/2001 Giakos ..................... 250/394

FOREIGN PATENT DOCUMENTS

WO    WO2005/121756    * 12/2005

* cited by examiner

METHOD AND SYSTEM FOR DETECTING SUBSTANCES, SUCH AS SPECIAL NUCLEAR MATERIALS

FIELD OF THE INVENTION

The present invention relates generally to methods and systems for detecting small amounts of special nuclear materials (SNM), illicitly-transported in cargo and vehicles.

BACKGROUND OF THE INVENTION

In recent years, ever-higher priority is being accorded to developing state-of-the-art security-screening methods and devices that will rapidly and reliably detect small quantities (tens of grams) of illicitly-transported SNM. Sensitivity of this order is required to interdict their use in, for example, panic-creating radiological dispersion devices (RDD's) deployed in densely-populated areas, or SNM accretion for the fabrication of improvised nuclear devices (IND's). Indeed, effective countering of these threats is currently considered one of the highest-priority medium-term R&D challenges at the U.S. Dept. of Homeland Security (DHS), among other national and international law-enforcement agencies. For obvious reasons, the severity of the detection problem tends to increase sharply with the mass and volume of the objects to be screened.

The following are examples of the prior art:

a) Passive Radiation-Monitoring Systems:

Such "Portal Monitors" were developed for the purpose of interdicting theft or diversion of SNM from high-security sites. The detection of SNM is based on measuring an increase in radiation intensity above the ambient background. Among others, LANL (Los Alamos National Laboratories) and LLNL (Lawrence Livermore National Laboratories) have been active in developing such systems, which are usually packaged in three distinct categories: 1) Small, Hand-Held Monitors 2) Automatic Pedestrian Monitors 3) Automatic Vehicle Monitors.

Vehicle monitoring systems for detecting SNM are now available from several commercial companies. Among these, Canberra's JPM-12A Vehicle Monitor was developed jointly with LANL. It consists of two large plastic scintillators positioned on either side of the portal, that measure the gamma-rays emitted from SNM. The instrument can detect 10 gr of Pu and 1000 gr of HEU in an unshielded vehicle moving at a speed of 2 m/s. The disadvantage of this method is that gamma detection can be thwarted with relative ease by enveloping the SNM with Pb-sheet, since the minimum detected quantities increase rapidly by an order of magnitude when shielded by several mm of it. In the Pu case, the problem can be countered by using neutron detectors in the portal. However, due to low neutron emission rates, this approach requires large-area neutron detectors. LANL has developed such a system, based on two large-area $^3$He detectors between which vehicles pass. An equivalent system is currently marketed by TSA-Systems-Ltd., Model NVM-245. NUCSAFE's Vehicle Monitor claims detection of 5 gr of gamma-shielded weapons-grade Pu within 10 s at 1 m distance. Also available are gamma-neutron Vehicle Portal Monitors manufactured by LAURUS-Systems-Inc. Model No. VM-250GN and by POLIMASTER, Model Series PM5000. For the latter, which incorporate sizeable plastic-scintillator detectors as well as large-area $^3$He proportional counters, detection of 4.3 gr $^{239}$Pu and 300 gr $^{235}$U at a scan speed of 10 km/hr is claimed. However, in analogy to γ-rays, small Pu quantities might evade detection if some neutron shielding is introduced.

b) Single-Energy Radiography Systems

This method yields information about the contents of a screened object. A number of systems have been developed in recent years by commercial companies. Nearly all of them use high energy bremsstrahlung radiation produced by high-power linacs, although SAIC have built a line of products (VACIS) around a radioactive $^{60}$Co source. In several systems, two views at 90° to each other are generated, to obtain more information. Commercial companies such as Smiths-Heimann and Aracor produce linac-based vehicle and marine container inspection systems. They operate at electron energies of ~10 MeV and employ Cadmium-Tungstate radiation detectors. The spatial resolution permits the detection of 1 mm copper wire. The scan time is ~3 minutes for a 20 m-long vehicle, but the visual inspection time of the resulting image typically takes 10-15 minutes. These systems penetrate ~30 cm of steel and the radiation dose to the object is about 150-250 μGy. Their obvious drawback is that they do not automatically identify SNM and in general, the performance of such systems relies heavily on operator skill and judgment.

c) Dual-Energy Radiography (DER) Systems

DER is a well-established technique that has found numerous applications in medical imaging (in particular, in-vivo bone mineral densitometry), environmental studies, material assaying, NDT, NDE, as well as security inspection scenarios. It is based on comparing the transmission attenuation at two energies, a sensitive measure for the atomic number Z of absorbers in the line-of-sight from radiation source to detector.

DER scans are usually performed at energies where the photoelectric component of the transmission attenuation dominates. One particular variant exploits characteristic discontinuities in attenuation when the incident photon energy is varied around inner-atomic-shell (K,L,M, . . . , ) binding energies of a particular element. Typically, the latter vary with $Z^2$. Locating such an energy-discontinuity (by comparing the photon flux transmission above and below it) is a sensitive indication of the presence of the element in question in the field-of-view. However, this variant of the method is unsuitable for inspecting massive cargo such as aviation or marine containers, since the relevant K-binding energies (the highest-energy discontinuities) for Z~92 are at ~110 keV, an energy too low to penetrate the inspected items.

In summary, the inadequacy of existing screening methods to effectively interdict the illicit-transport of SNM at the crucial outgoing and incoming control points underscores the need for novel inspection systems that will reliably detect the presence of small quantities of SNM in cargo items ranging in magnitude from small packages, through passenger baggage, palletized cargo and aviation containers, up to a full-size marine container, loaded land-vehicle or railroad freight-car.

SUMMARY OF THE INVENTION

The present work describes a novel and sensitive method for detecting small quantities of special nuclear materials (SNM) concealed in packages, passenger baggage, massive cargo and vehicles. It is based on dual-energy radiography (DER) of discrete, high-energy γ-rays, whereby the pair-production-related increase in transmission attenuation with photon energy characteristic of high atomic number (Z) materials is exploited to detect and distinguish them from the low-Z and medium-Z substances that make up the overwhelming majority of benign transported items. Moreover, it is possible to differentiate between threat materials and other, benign high-Z substances of lower density, such as Hg, Pb or Bi, provided at least two DER projections are taken.

In order to construct a practicable system with good performance characteristics, judicious choices of γ-ray energies and populating reactions employing low-energy ion beams at sub-mA intensities are preferable. To this end, a comprehensive literature study of reaction-induced γ-ray yields has been performed, providing best-mode radiation sources, although the invention is not limited to these radiation sources. These are the $^{12}$C lines at 4.43 MeV & 15.09 MeV populated, in decreasing yield order, by the $^{11}$B(d,n), $^{13}$C($^{3}$He,α) & $^{10}$B($^{3}$He,p) reactions at energies $E_{beam}$<5 MeV. An alternative option is presented by the $^{11}$B(p,γ) reaction, for which $E_p$~9 MeV may be needed to fully exploit the giant-dipole-resonance γ-rays at 16-24 MeV. The yield of the latter reaction is lower than that of d-induced and $^{3}$He-induced reactions, but it may give rise to superior image contrast sensitivity, the upper DER gamma-ray energy being higher.

The best-suited detectors may be organic scintillators with pulse-shape-discrimination (PSD) properties. As shown by a preliminary simulation, an operational DER inspection system built around such components may enable reliable detection of small (tens of gr) SNM quantities within short scanning times (typically, a few minutes), even in massive cargo items and loaded vehicles that exhibit high image clutter. Typical absorbed radiation doses to screened items would be in an acceptable range of (1-10)μGy.

There is thus provided in accordance with an embodiment of the present invention a method for detecting substances, the method including performing multi-view, multi-energy radiography by irradiating objects with a plurality of discrete high-energy gamma rays at a plurality of different orientations, and detecting and mapping radiation passing through the object with at least one array of detectors, and indicating the presence of a high-Z substance (e.g., SNM), by detecting a difference in transmission attenuation characteristic of the high-Z substance, as opposed to low-Z and medium-Z substances.

The method may also include determining and localizing regions within the object containing the high-Z, high-density substance by means of the multi-view, multi-energy radiography, in order to enhance specificity to SNM, as opposed to other high-Z materials.

There is also provided in accordance with an embodiment of the present invention a system for detecting substances, the system including a dual-energy radiography (DER) system including a gamma-ray radiation source, including a beam accelerator and a target to which the accelerator sends a beam thereby producing gamma rays, and a plurality of gamma ray detectors positioned to detect gamma ray beams that pass from the radiation source through an object to be inspected, wherein the DER system is adapted to indicate a presence of a high-Z substance, by detecting a difference in a transmission attenuation characteristic of the high-Z substance as opposed to low-Z and medium-Z substances.

The DER system may make two measurements of transmission attenuation characteristics, one measurement performed at a photon energy close to the global absorption minimum for all atomic numbers Z (at ~4 MeV) and another at a higher photon energy.

DETAILED DESCRIPTION OF EMBODIMENTS

Dual-Energy Radiography in the Present Scenario—Basic Physics

In view of the fundamental limitations of existing screening equipment described in the previous section, recourse may be made to characteristic features of the attenuation process that come into play at higher photon energies (in the 1-30 MeV range), for which the radiation is much more penetrating. In this photon energy range, the pair-production attenuation mechanism comes into play, so that the total attenuation coefficient exhibits a rise above ~4 MeV, which is progressively more pronounced as the Z of the absorber increases. Thus, in order to distinguish between high-Z materials and lighter elements, one measurement may be performed at the global absorption minimum for all atomic numbers Z (at ~4 MeV) and another at higher energy. This is the basis for SNM detection underlying the present work.

Specifically, the intensity-fraction transmitted through two absorbers of atomic number $Z_a$, $Z_b$ at each of two different photon energies $E_{\gamma 1}$ & $E_{\gamma 2}$ is given by the expression:

$$T(E_{\gamma i}) = e^{-(\mu a_i \cdot \rho a \cdot xa + \mu b_i \cdot \rho b \cdot Xb)}, \quad i=1,2 \qquad \text{eq. (1)}$$

where $\rho$, $\mu$ & x are the density, specific attenuation coefficient and thickness in the line-of sight from source to detector, for absorbers a & b, respectively. The coefficients $\mu$ are characteristic and known functions of both Z and $E_\gamma$.

It follows from eq. (1) that the Transmission Ratio at the two energies is given by:

$$T(E_{\gamma 1})/T(E_{\gamma 2}) = e^{-(\Delta \mu a \cdot \rho a \cdot Xa + \Delta \mu b \cdot \rho b \cdot xb)} \qquad \text{eq.(2)}$$

Thus, high sensitivity for detecting absorber a (threat object) against a background of absorber b (benign object) will be obtained when the differences in attenuation coefficient $\Delta \mu$ obey the following relations:

$$|\Delta \mu_a| = \text{maximal and } |\Delta \mu_b| = \text{minimal}$$

Clearly also, the effect of any benign absorber b on this ratio cannot be fully eliminated unless $\Delta \mu_b = 0$.

Figure 1:
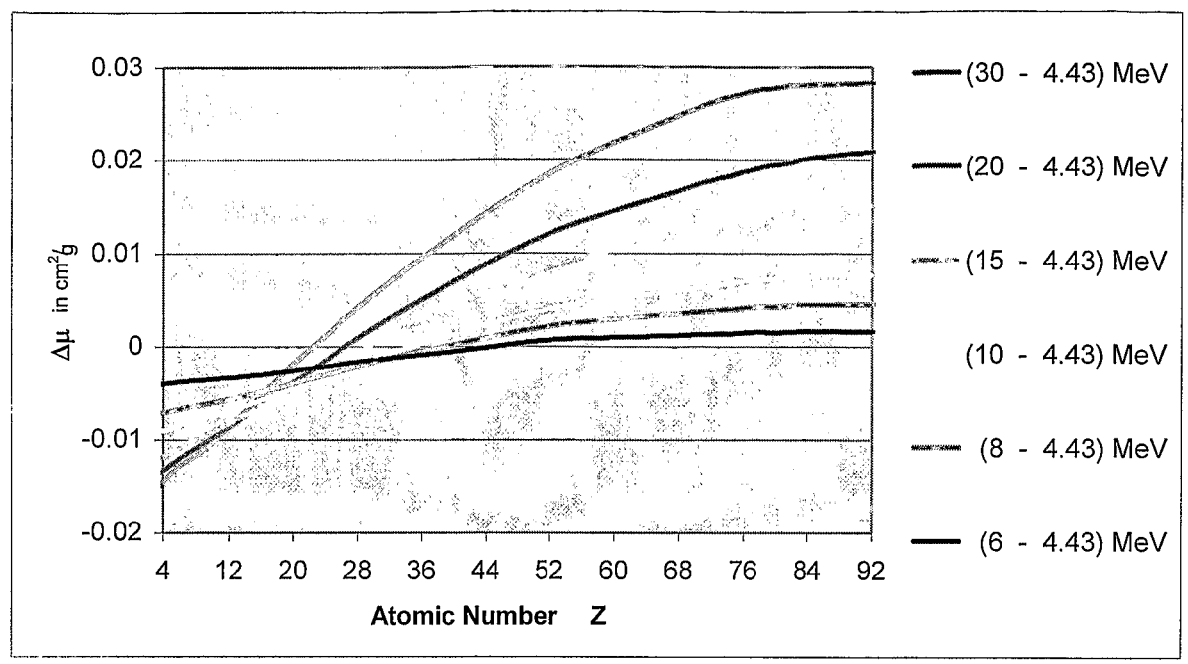
FIG. 1 is a simplified graph of values of Δμ as a function of Z for various photon energies, relative to $E_{\gamma low}$=4.43 MeV, the abscissa being the atomic number Z, and the ordinate, Δμ in cm$^2$/g.

In order to illustrate the consequences of eq. (2), the compiled values for the quantity:

$$\Delta \mu = \mu(E_{\gamma high}) - \mu(E_{\gamma low} = 4.43 \text{ MeV})$$

are shown in FIG. 1 as function of atomic number Z, for several photon energies $E_{\gamma high}$. The choice of the lower energy $E_{\gamma low} = 4.43$ MeV was dictated by the fact that it corresponds to the global minimum in attenuation coefficient $\mu$ as function of energy, and also to a copiously-produceable $^{12}$C gamma-ray.

FIG. 1 shows that the $\Delta \mu$ values are indeed small for medium-Z materials and even negative for low-Z materials. Moreover, the sensitivity to high-Z materials increases quite sharply with photon energy $E_{\gamma high}$. Thus it is desirable, on contrast-sensitivity grounds, to employ the highest photon energy $E_{\gamma high}$ possible.

Figure 2:
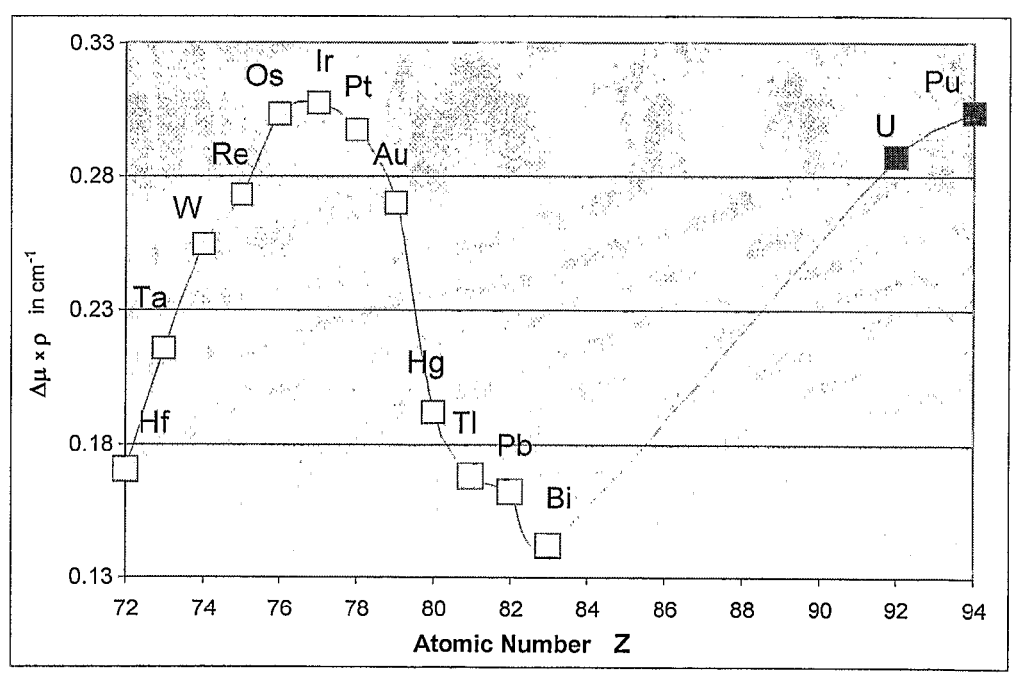
FIG. 2 is a simplified graph of Δμ·ρ, the difference in macroscopic attenuation coefficient calculated for $E_{\gamma high}$=15.09 MeV and $E_{\gamma low}$=4.43 MeV at the stable high-Z elements, beginning with the last rare earth (Hf), using nominal bulk densities, the abscissa being the atomic number Z, and the ordinate, Δμ·ρ in 1/cm.

In order to illustrate the specificity of DER to SNM, as distinct from other high-Z materials, FIG. 2 shows $\Delta$MAC, the difference in macroscopic attenuation coefficient $\Delta \mu \cdot \rho$ (where $\rho$ is the bulk density) of high-Z material traversed, calculated for $E_{\gamma high} = 15.09$ MeV and $E_{\gamma low} = 4.43$ MeV. Such parametrization (see eq. (2)) is meaningful, since the volume distribution of $\Delta$MAC for suspect items can be estimated with adequate precision (in voxels of ~1 cm$^3$) from a small number of DER views(at least two).

Clearly, on the basis of the macroscopic attenuation, SNM (in FIG. 2, uranium and plutonium) can be readily distinguished from Rare-Earths and the heaviest stable elements (hafnium, thallium, lead and bismuth in FIG. 2) and to a lesser extent, from the transition metals (tantalum and mercury in FIG. 2). The only difficulty appears to be with the noble metals and their neighbours (tungsten, rhenium, osmium, iridium, platinum and gold in FIG. 2) as well as natural or depleted uranium, none of which are likely to be transported as undeclared cargo. Alarms caused by such materials will thus tend to be rather rare occurrences and would not be considered as false, in strictly operational terms.

Continuous-Spectrum and Discrete-Line Photon Sources for DER

Hitherto, most DER applications have employed continuous-energy spectra, such as those produced in electron-beam-induced Bremsstrahlung (BS) sources. However, in the present application, working with BS-sources is not preferred due to three of their fundamental characteristics, namely:

I. the flux tends to be concentrated at relatively low energies and tails off at high energies, thus reducing contrast II. the transmitted flux spectrum is itself a function of the atomic numbers and areal-densities of the absorbers traversed III. the low duty factor of typical BS beams (~1‰) is unfavorable for spectroscopy (single event counting)

Thus, even though the present invention can be carried out with continuous-energy sources, it is nevertheless preferred to use discrete-energy nuclear-reaction-induced sources. Basic (although non-limiting) system requirements for DER are as follows:

a. production of $E_{\gamma low}$ and $E_{\gamma high}$ in the same nuclear reaction
b. clean gamma-ray spectra (in the sense of containing as few other lines as possible)
c. minimal neutron production and activation of environment
d. populating reaction accessible with low-energy, low-intensity, non-exotic beams and durable targets
e. robust, reliable, compact, low-cost accelerator, not requiring further development
f. reliable, low-cost detectors that resolve $E_{\gamma low}$ from $E_{\gamma high}$ and discriminate against interfering radiation, either via their spectroscopic or timing properties (pulse shape discrimination), or via time-of-flight, or via any combination thereof.

These requirements on nuclear-reaction-induced sources, as well as the paramount contrast-sensitivity criterion, that favors working with the highest possible gamma-ray energy $E_{\gamma high}$, serve as guidelines in selecting the most appropriate nuclear reactions for the present application. However, it is emphasized that the invention is not limited to these guidelines.

Figure 3:
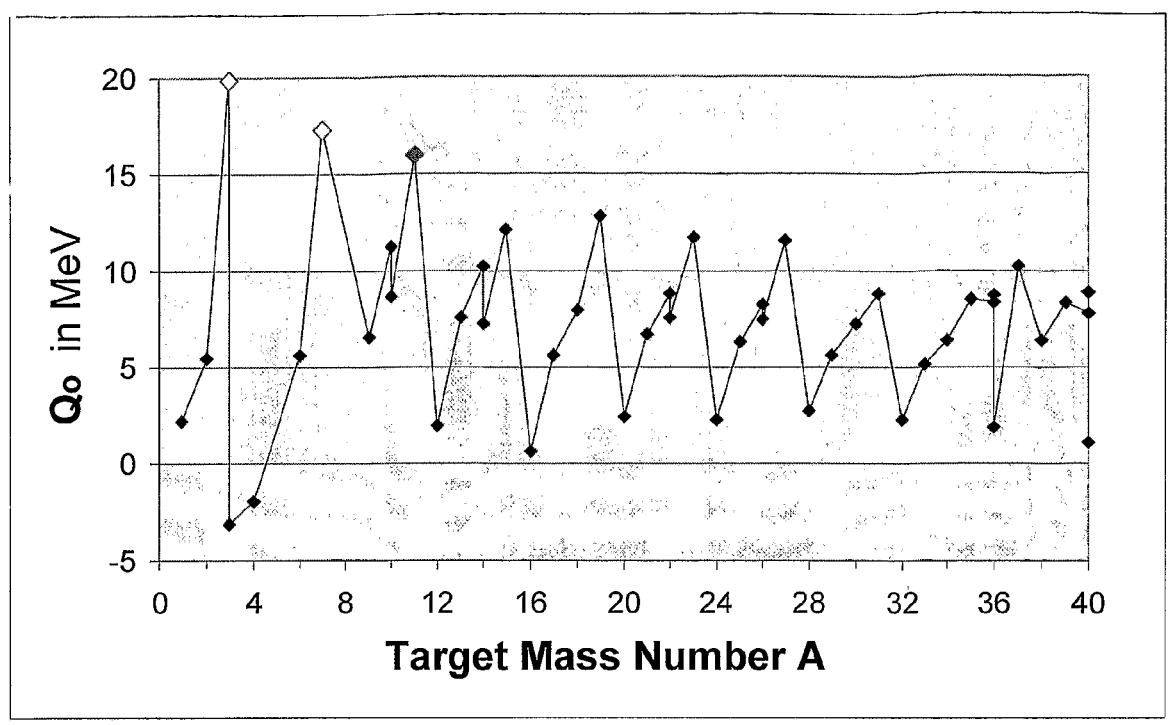
FIG. 3 is a simplified graph of the systematics of ground-state Q-values for p-capture reactions on light nuclei, the abscissa being the target mass number A, and the ordinate, $Q_0$ in MeV.

Initially, the nucleus in which the optimal levels and transitions are to be found may be identified. This is readily accomplished by considering the proton separation energies in light nuclei, or equivalently, the ground-state Q-values ($Q_o$) for the (p,γ) proton-capture reaction. The latter represent a measure of the intrinsic exo-thermicity of the nuclear process (over and above the kinetic energy imparted by the incoming proton) and thus of the degree of excitation achievable in the final nucleus. Their systematics in light nuclei, taken from a well-known compilation, are shown in FIG. 3.

The global variations and local fluctuations in this plot represent a superposition of nuclear-shell closure effects (at the "magic" numbers), pairing-force effects (odd-even staggering in neighboring nuclei) and most prominently, α-clustering effects (the dominant repetition pattern of maxima in Qo is 4 mass units).

The highest excitations (two open diamonds on the left in FIG. 3) are obtained for p-capture on $^3$H and on $^7$Li. However, both these reactions are not preferred for the present application, since their cross-sections (and gamma-yields) are low. The next best target nucleus (by far) is $^{11}$B (solid diamond just to the right of the above-mentioned open diamonds in FIG. 3). Thus the nucleus in which the highest excitations can be achieved is $^{12}$C, which is the product of the $^{11}$B(p,γ) reaction.

Populating the final nucleus at high excitation is a necessary but not sufficient condition for generating high-energy gamma-rays with low-energy particle beams. A further requirement is that the highly-excited levels may decay predominantly (or at least appreciably) to the ground-state or to low-lying excited states in a single transition. In general, this is not the case, because, at high excitation, when a nucleus has the possibility of decaying by particle emission (via the so-called "strong" nuclear force), its branching ratio for emitting gamma-rays (decay via the "electromagnetic" force) is usually rather small. However, for certain "pathological" states, quantum-mechanical selection rules can drastically inhibit particle emission. Such states will indeed decay appreciably via gamma emission. Classic examples of this are isospin T=1 states in self-conjugate (N=Z) light nuclei, which are forbidden to decay via a-particle emission. Since T is known to be a good quantum number in light nuclei, these selection rules can inhibit particle emission by many orders of magnitude, and in certain cases they do.

Figure 4:
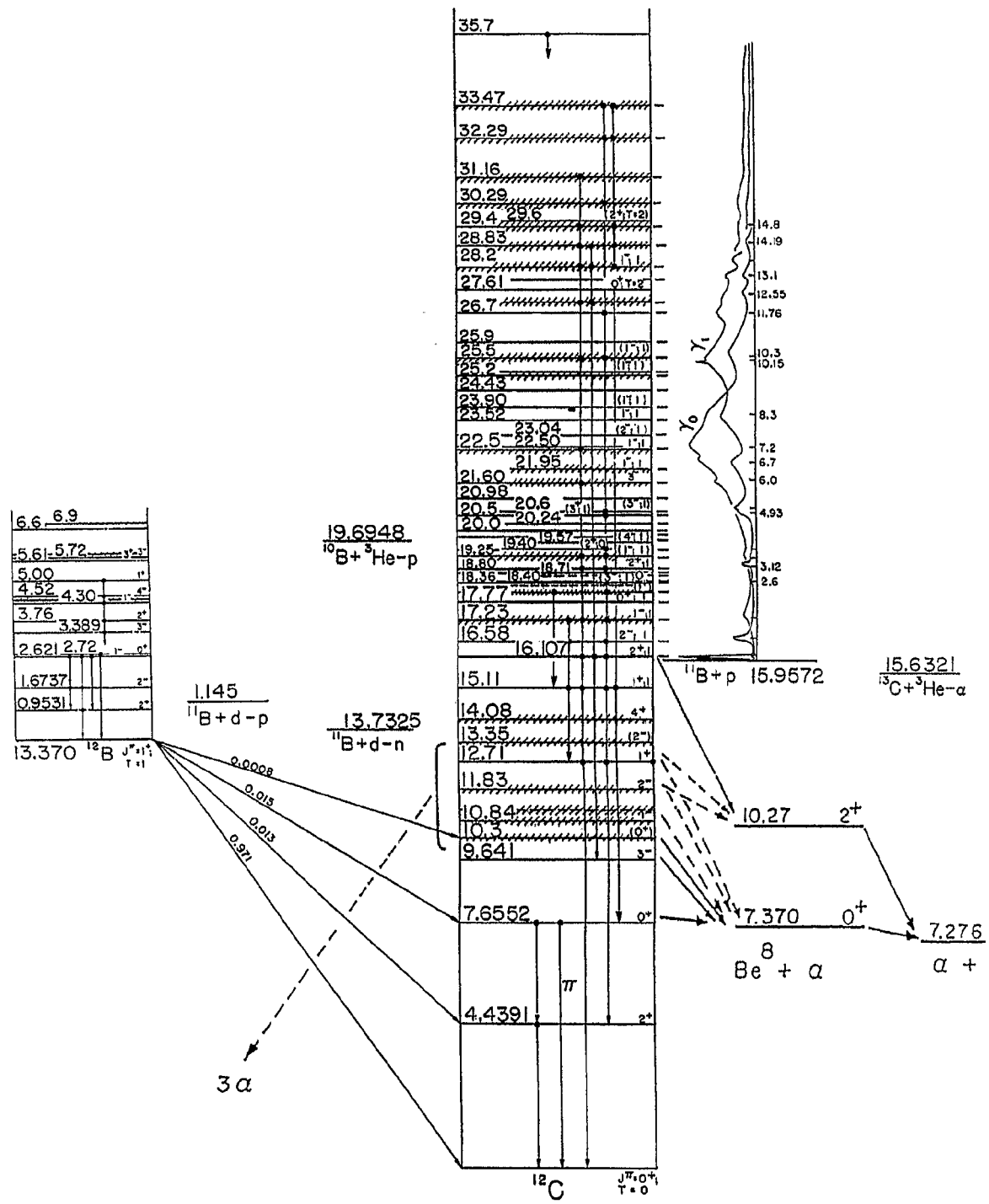
FIG. 4 is a simplified level scheme of $^{12}$C showing the states of interest, along with various reactions that feed and de-excite them. The $^{11}$B(p,γ) excitation curve is shown alongside the corresponding states, clearly showing the giant dipole resonances that decay to the ground-state and to the 1$^{st}$ excited state. Also shown are the low-lying states of $^{12}$B fed in $^{11}$B(d,p) and their decay modes.

All these desirable properties are to be found in the $^{12}$C nucleus (which has N=Z=6), the level scheme of which is presented in FIG. 4. The high-energy gamma-transitions in $^{12}$C, along with the 4.43 MeV transition, will constitute the first described embodiment of the present invention (see next section). Also shown in FIG. 4 are the low-lying levels of $^{12}$B and their decay modes, which will figure in another embodiment, described further hereinbelow.

First Embodiment

In-Beam, Reaction-Induced $^{12}$C γ-Ray Yields

In the DER context, it is clear from FIG. 4 that the 4.43 MeV gamma-ray is a prime candidate for $E_{\gamma low}$. With respect to $E_{\gamma high}$, the most attractive candidates are the discrete level at 15.09 MeV, accessible via the following reactions $^{11}$B(p,γ), $^{11}$B(d,n), $^{10}$B($^3$He,p) and $^{13}$C($^3$He,α) and the Giant Dipole Resonance (GDR) around 23 MeV (accessible via $^{11}$B(p,γ) at $E_p$=6-10 MeV). The latter decays predominantly to the $^{12}$C ground-state and first excited-state via gamma radiation referred to hereinbelow as $\gamma_0$ and $\gamma_1$, respectively.

Nuclear Reaction Yields

Figure 5:
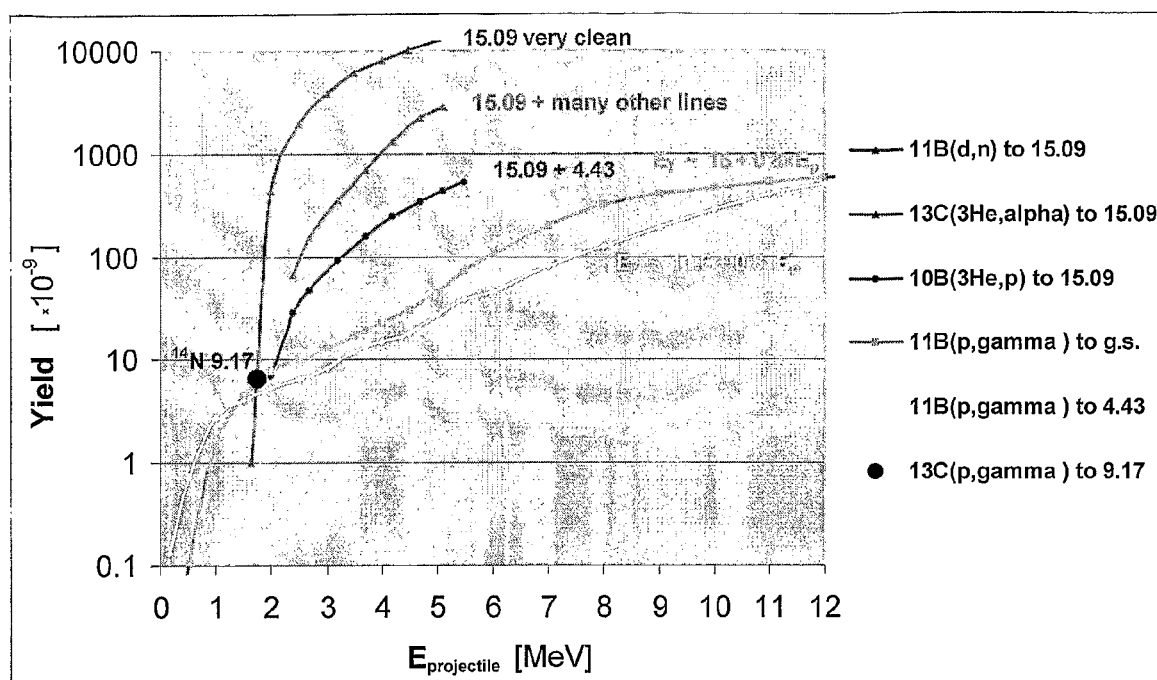
FIG. 5 is a simplified graph of measured thick-target yields per projectile of reactions generating high-energy $^{12}$C γ-rays, the abscissa being $E_{projectile}$ in MeV, and the ordinate, the yield (x 10$^{-9}$). The yellow (labeled Y) and magenta (labeled M) curves both pertain to the p-capture reaction, but the yields refer to gamma-rays leading to the 1$^{st}$ excited state & ground state, respectively. The energies differ by 4.43 MeV and vary with incident proton energy as indicated near the curves themselves. The yield increase above ~5 MeV is due to the giant dipole resonance. The blue (labeled B) and green (labeled G) curves refer to the 15.09 MeV yields from reactions with $^{3}$He beams, of varying yield and spectral cleanliness, as indicated near the curves. The red curve (labeled R) represents the 15.09 MeV yield from the (d,n) reaction on a $^{11}$B target. Apart from the effects of neutrons, these gamma-spectra (see FIGS. 6 and 7) are remarkably clean. For comparison, the black circle on this figure indicates the 9.17 MeV gamma-yield from p-capture on $^{13}$C, the nuclear reaction on which the Gamma-Resonance Absorption (GRA) method for detecting nitrogenous explosives is based.

The expected thick-target gamma-ray yields (per projectile) of the 15.09 MeV line and the GDR lines in the above-mentioned reactions were obtained by energy-integration of the published experimental cross-sections and are shown in FIG. 5.

Several comments on these reactions already appear in the caption to FIG. 5 and need not be repeated. Clearly, the choice of reaction defines an order-of-magnitude yield hierarchy: p-capture is the weakest (but the mean $E_{\gamma high}$ is higher than 15.09 MeV, thereby enhancing the contrast sensitivity) and $^3$He-induced processes are intermediate. Deuteron-stripping is the best, although its feeding of the 15.09 MeV state has a threshold at $E_d$~1.6 MeV. At $E_d$~3 MeV, the yield of 15.09 MeV gamma-rays is ~3 orders of magnitude higher than the 9.17 MeV yield in the Gamma-Resonance-Absorption (GRA) method underlying nitrogenous explosives detection. For those skilled in the art of security screening applications, this feature probably best underscores the applicability of the present invention with the $^{11}$B(d,n) reaction. At energies above $E_d$~3 MeV, the thick-target (d,n) gamma yield will continue to rise approximately as $E_d^{1.5}$. This primarily reflects the deuteron range-dependence on energy, since the cross-sections are fairly flat. On the debit side, these reaction-induced gamma sources are characterized by relatively high associated fast-neutron yields, as illustrated by the following table:

TABLE 1

Thick-Target Yields of fast-neutrons and 15.09 MeV γ-rays (or GDR decay γ-rays, where applicable) and their ratios at selected energies

| Projectile + Target | $E_{projectile}$ [MeV] | 15.09 MeV or GDR γ-ray Yield | Fast-Neutron Yield | Neutrons/γ [15.09 MeV or GDR] |
|---|---|---|---|---|
| d + $^{11}$B | 3.0 | 4.5 · 10$^{-6}$/d | ~2.3 · 10$^{-5}$/d | ~5 |
| d + $^{11}$B | 5.0 | 6.0 · 10$^{-6}$/d * | <1.8 · 10$^{-5}$/d* | <3 * |
| $^3$He + $^{13}$C | 5.0 | 3.0 · 10$^{-6}$/$^3$He | >2 · 10$^{-5}$/$^3$He ** | >7 ** |
| $^3$He + $^{10}$B | 5.3 | 4.0 · 10$^{-7}$/$^3$He | >4 · 10$^{-6}$/$^3$He ** | >10 ** |
| p + $^{11}$B | 3.0 | ~1 · 10$^{-8}$/p GDR($\gamma_0 + \gamma_1$) | 0 (below (p, n)) | 0 |
| p + $^{11}$B | 3.5 | ~3 · 10$^{-8}$/p GDR($\gamma_0 + \gamma_1$) | ~1 · 10$^{-5}$/p | ~300 |
| p + $^{11}$B | 4.0 | ~4 · 10$^{-8}$/p GDR($\gamma_0 + \gamma_1$) | ~3 · 10$^{-5}$/p | ~800 |
| p + $^{11}$B | 6.0 | ~1.6 · 10$^{-7}$/p GDR($\gamma_0 + \gamma_1$) | ~2.5 · 10$^{-4}$/p | ~1500 |
| p + $^{11}$B | 9.0 | 7.0 · 10$^{-7}$/p GDR($\gamma_0 + \gamma_1$) | ~1.4 · 10$^{-3}$/p | ~2000 |

* employing an intermediately-thick target (~4 mg/cm$^2$), which degrades the deuteron beam energy down to 4 MeV
** lower limits, since only the ($^3$He, n) channel was taken into account, whereas ($^3$He, pn) was neglected (no data available)

The neutron yields in Table 1 were calculated in analogous fashion to the gamma-ray yields of FIG. 5, namely, by energy-integration of the published experimental cross-sections. It is clear from the results that (d,n) has the edge over p-induced and $^3$He-induced reactions not only with respect to gamma-yield, but also in terms of minimizing the neutron/gamma yield ratio.

The unique exception to this trend is the p+$^{11}$B system below the (p,n) threshold at $E_p$=3.0 MeV, but the gamma yields per projectile are almost three orders of magnitude lower than with d+$^{11}$B. With increasing proton energy, the gamma-yields increase quite sharply, but the neutron yields increase even faster, so that the neutron/gamma ratios become unacceptably high, as can be seen from the table.

For $^3$He-induced reactions, there is no bombarding energy at which the neutron/gamma yield ratio is minimized, since all gamma and neutron producing reactions are exothermic (no thresholds) and their cross-sections are essentially independent of energy.

Finally, with the (d,n) reaction, there appears to be a possibility of reducing the neutron/gamma ratio, by raising the beam energy to $E_d$~5 MeV and employing a target of a thickness that does not degrade the beam below $E_d$~4 MeV. This may be due to a marked reduction in the (d,n) cross-sections to the ground-state and first-excited-state of $^{12}$C in this energy range. Of course, such improvement might be at the expense of the 4.43 MeV gamma yield, which is undesirable. At higher deuteron energies the cross-section behavior is not known, so it is possible that even more favorable beam-target conditions might exist. However, at $E_d$~6 MeV the (d,2n) channel opens, so optimal conditions are most likely to be found at incident deuteron energies around or below this value.

The next topics to be considered are: a) whether the in-beam d+$^{11}$B spectra are clean enough for the purposes of the present application and b) what measures can be adopted to alleviate the adverse effects of the high neutron yield. These issues are discussed in the following paragraphs.

Experimental Options for Ensuring Clean In-Beam Gamma Spectra

Figure 6:
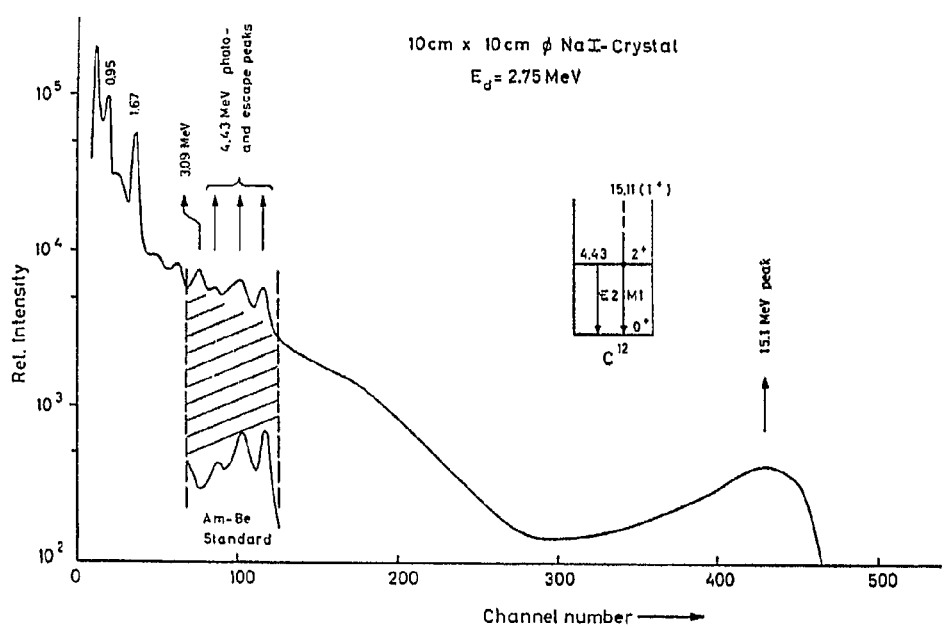
FIG. 6 is a simplified graph of an in-beam NaI gamma-ray spectrum from bombardment of a $^{11}$B target with a 2.75 MeV deuteron beam, the abscissa being the channel number and the ordinate, the relative intensity.
Figure 7:
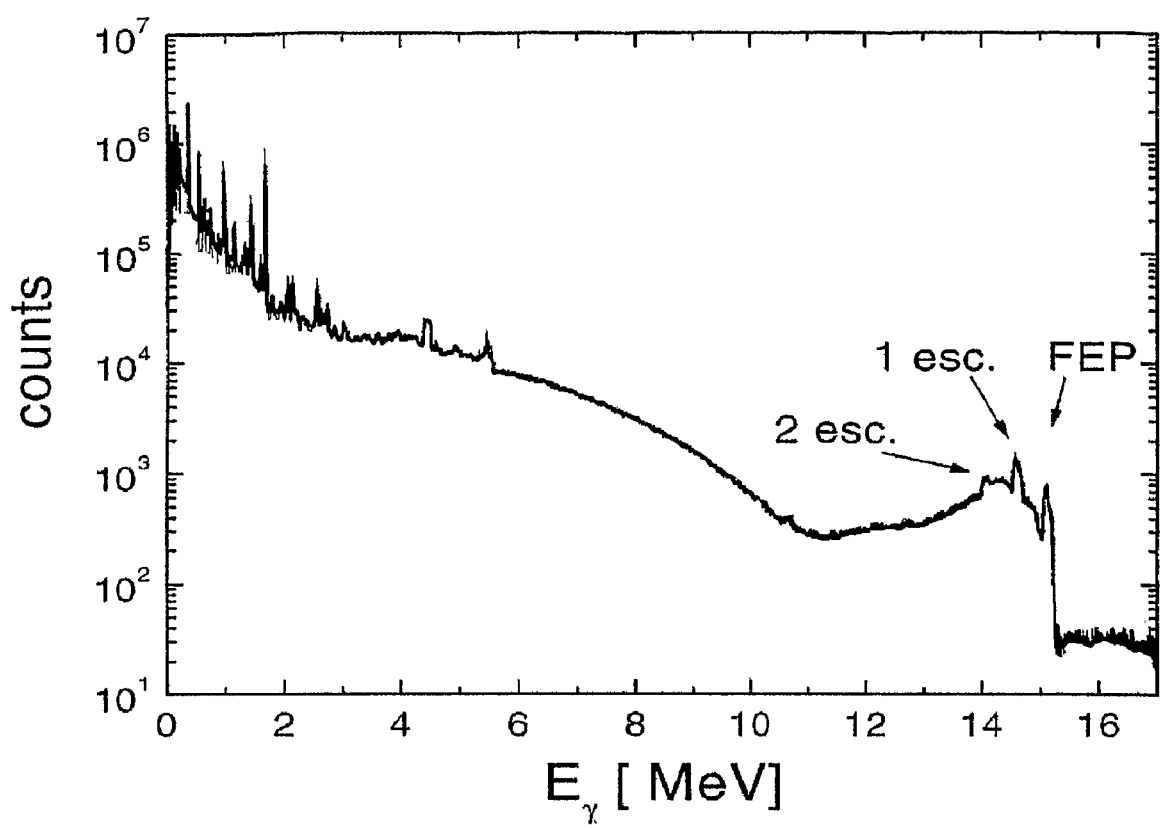
FIG. 7 is a simplified graph of an in-beam germanium gamma-ray spectrum from bombardment of a deuterium target with a 19.1 MeV $^{11}$B-beam, the abscissa being $E_\gamma$ in MeV, and the ordinate, the number of counts. The equivalent d-beam energy is 3.47 MeV.

In order to generate clean, background-free in-beam spectra, particularly with deuteron or $^3$He beams, certain experimental measures commonly implemented in nuclear spectroscopy may have to be taken. In this context, it is instructive to examine two published in-beam spectra. FIG. 6 displays a NaI gamma-ray spectrum with the $^{11}$B(d,n) reaction at an energy of $E_d$=2.75 MeV taken in the 1960's. FIG. 7 shows a spectrum taken in 2000 with "EUROBALL", a large Ge-spectrometer matrix surrounded by an array of NaI anti-coincidence counters. The latter employed the inverse reaction at a close center-of-mass energy.

Some features of these spectra relevant to the present application are:
a. the 15.09 MeV peak region is very clean in both cases
b. the spectra are very similar for the two detectors
c. the same characteristic continuum, extending up to ~10 MeV equivalent γ-ray energy, is seen
d. the 4.43 MeV radiation is prominent
e. in the NaI spectrum (FIG. 6), there are no other prominent peaks above 3.5 MeV The similarity of the NaI and Ge spectra, particularly with respect to the broad mid-spectrum bump, is a strong indication that this continuum is due to thermal-neutron capture in the detectors (which serve as "calorimeters" for the subsequent gamma cascades). The 3.09 MeV line in FIG. 6 was identified as being due to the $^{12}$C(d,p)$^{13}$C reaction, stemming from a carbon impurity in the boron target—indeed, as evident from FIG. 7, it is not seen in the inverse reaction. (Thus, care may be taken to prepare as pure a $^{11}$B target as possible and to ensure that no carbon deposits accumulate on it during beam bombardment.) The source of the 5.5 MeV peak in the Ge spectrum (FIG. 7) is unknown, but this is not directly relevant to the problematics of the present case, since the inverse reaction will not be employed in this application.

The above clearly shows that the primary sources of background under the 4.43 MeV line are thermal-neutron-capture events and low-pulse-height response events to 15.09 MeV gamma-rays. Measures that may be taken to alleviate the neutron-associated background problem are as follows:

1. using $^{11}$B target thicknesses that do not degrade the beam below the 15.09 MeV threshold ($E_d$=1.6 MeV)
2. fast-neutron dumps up & downstream from target—$^{11}$B(d,n) neutrons are forward & backward-peaked
3. accordingly, locating the DER radiography system at angles around 90° to the deuteron beam
4. surrounding the target by neutron-moderators and absorbers
5. enveloping the detectors in a thermal-neutron-absorbing material, such as Li, B, Cd or Gd
6. rejecting neutron-related and scattered events via the time-of-flight method
7. employing organic scintillators as gamma-ray detectors
8. low-frequency pulsing of the deuteron beam Measure #1 is explained in a paragraph further hereinbelow regarding targets—it should reduce neutron doses by ~30%.

Measures #2-6 are self-explanatory to the skilled artisan and will not be discussed further here. Each can be applied independently.

Measure #7 is based on the favorable feature that low-Z materials, such as organic scintillators, do not exhibit the thermal-neutron-capture feature characteristic of high-Z detectors. In contrast, such detectors have the drawback of being efficient for detecting fast neutrons, primarily via proton recoil accompanying n-p scattering on hydrogen. Specifically, neutrons of energy around 10 MeV will produce pulses equivalent to ~5 MeV gamma-rays, thereby generating spectral background under the 4.43 MeV region of interest. However, this problem may be solved by invoking the pulse-shape-discrimination (PSD) property of certain organic scintillators, that permits the distinction between fast-neutron and gamma-ray events in the detector via the difference in fall-time of the scintillation pulses. The PSD effect is most pronounced in liquids (where it gives rise to easily-detectable pulse-fall-time differences of 15-20 ns) but has also been observed, albeit to a lesser extent, in plastic scintillators.

Measure #8 is explained in the context of the second embodiment, hereinbelow.

Once the fast and slow neutron-events have been suppressed, the principal spectral background under the 4.43 MeV line may be due to low-amplitude 15.09 MeV gamma-ray events. However, a response-optimized organic-scintillator may exhibit a flat background in the region of interest, that can be reliably subtracted from the 4.43 MeV peak. In this context, one should also consider the use of deuterated scintillators, in which the 2.2 MeV γ-ray from slow-neutron-capture by hydrogen is eliminated. It would permit utilizing a higher fraction of the response curve to 4.43 MeV gamma-rays, thereby increasing the detector efficiency.

Employing organic scintillators might thus be advantageous (and also considerably cheaper), but may incur some loss in detection efficiency.

It is noted that different kinds of scintillators may be employed in the invention. For example, as mentioned before, the scintillators may be organic scintillators (e.g., organic liquid scintillators and/or organic plastic scintillators, with or without pulse-shape-discrimination properties. Alternatively, the detectors used may include inorganic scintillator spectrometers, such as but not limited to, NaI, BGO or $BaF_2$. As another alternative, the detectors used may include solid-state radiation spectrometers, such as but not limited to, Ge, CdTe or CdZnTe (CZT). When employing organic scintillators without the pulse-shape discrimination feature, or alternatively, when using inorganic scintillators or solid-state radiation spectrometers, invoking one or more of Measures #1-6 may in itself provide adequate discrimination against spectral contamination by fast or slow neutrons. This depends on the detailed experimental conditions prevalent in a specific application of the invention.

Implications of γ-Source for System Operating-Mode & Performance

Figure 8:
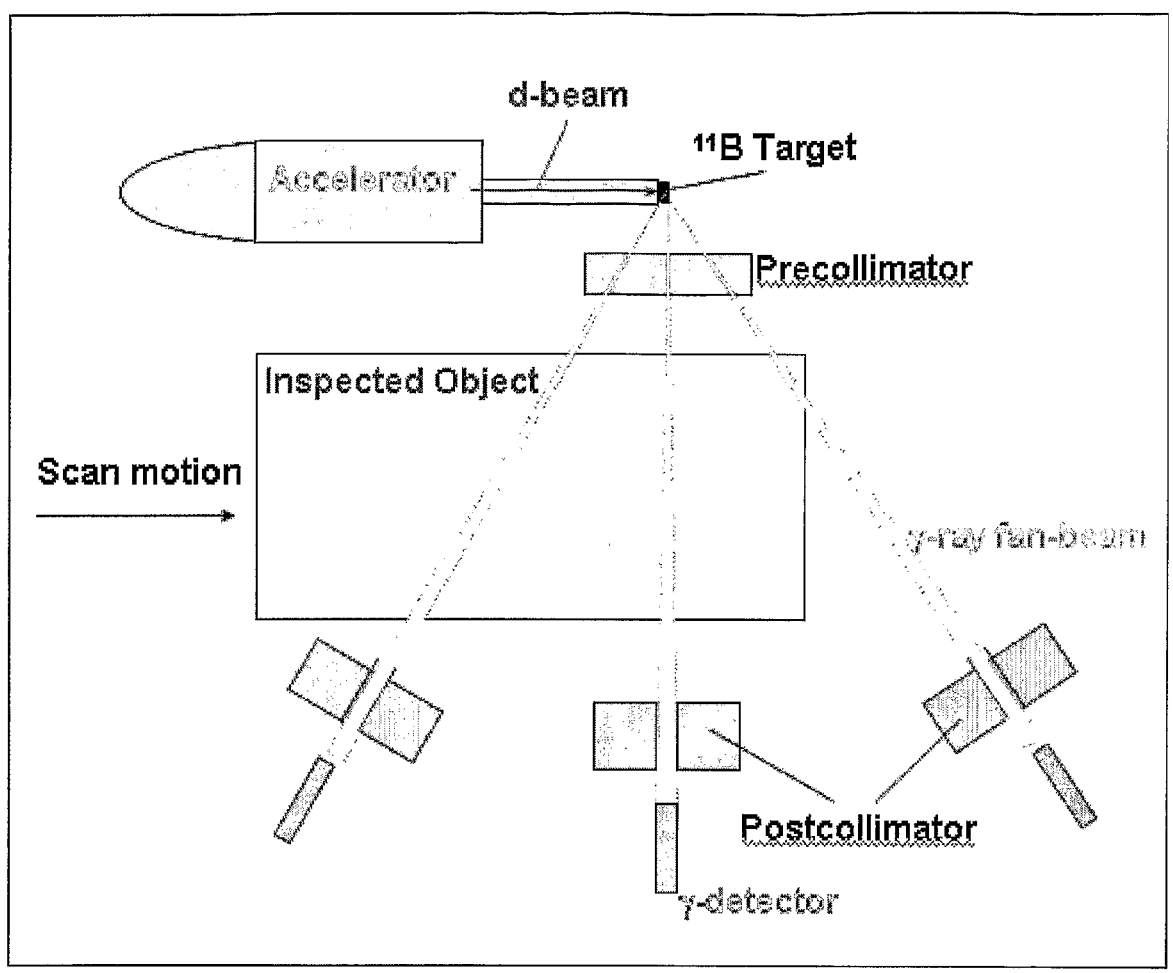
FIG. 8 is a simplified schematic outline of a nuclear-reaction-based, stand-alone DER screening system, constructed and operative in accordance with an embodiment of the present invention, in the plane of the d-beam and central γ-detectors. It shows how several radiographic projections can be obtained in a single pass, using a number of detector arrays.

For the purpose of the discussion, a 2-dimensional schematic of the DER embodiment as a stand-alone system is shown in FIG. 8. Its conventional aspects will not be elaborated on here, the emphasis being on features specific to this application. Fan beams and associated detector arrays are perpendicular to the plane of the drawing.

FIG. 8 explicitly cites the $^{11}B(d,n)$ reaction, but would essentially be unchanged for p-capture or $^3$He reactions. Several experimental and procedural features will now be discussed (accelerator and target issues are discussed further hereinbelow).

Multi-View DER

One of the features illustrated in FIG. 8 is that, using a number of collimator and detector arrays, a set of radiographic projections (views) of the screened object may be obtained simultaneously. This translates into a gain in system throughput, as well as facilitating the density reconstruction procedure, which permits discrimination against other, innocuous high-Z substances (see also hereinbelow).

Stringent collimation of the γ-beams to a fan geometry (perpendicular to the X-Y plane of FIG. 8) may be used to minimize the adverse effects of scattered radiation, a major problem with high-energy gamma-rays, especially traversing large, massive objects. Such scattering will primarily tend to reduce contrast sensitivity, but it will also have the effect of blurring the image features (edges).

The inspection scenarios envisaged by the present invention pertain to:

1: The DER Object-Screening Sequence for a Stand-Alone System

With the interrogating radiation produced by a nuclear reaction (as opposed to a Bremsstrahlung source), the low amounts of radiation available may be judiciously utilized, if the DER system is to achieve high throughput, high detection probability and low false-alarm rates.

The transmission sampling of the two γ-ray energies may be effected in identical irradiation geometry through any part of the interrogated object. Accordingly, the object-screening sequence may comprise one or more (in most cases, not more than two) of the following stages:

I. a rapid pre-scan, to classify the overall y-ray-attenuation general range

II. a full scan with one detector array, to locate regions suspected of containing high-Z materials III. multi-view scans (FIG. 8), to establish presence of high-Z (along the lines previously described)

IV. a localized scan with ultra-clean spectra (as mentioned above), to confirm presence of high-Z V. a repeat of one or more of the above stages in borderline cases, to eliminate persistent false-alarms At stages I-III, the object will be scanned in continuous translational motion, possibly at variable speeds. Stage IV will only be implemented on the regions that proved problematic in the continuous scans.

In the DER system of the present invention, it may be feasible to subject all decision-making to computer control, with respect to: the specific scanning sequence to be performed, the mechanical motions required to execute it, as well as the data acquisition modes and analysis routines implemented for appraisal of the container status ("as yet undetermined", "clean", "suspect" or "bingo") throughout its interrogation.

2. Using Nuclear-Reaction-Based DER Systems in Conjunction with Other Systems

Depending on the details of the application scenario and the nature of threat-objects to be detected, it may prove of interest to deploy a screening system based on the present invention in conjunction with some other system.

2a) The latter could be, but is not limited to, a BS-based, single or dual-energy radiography system. If such a system possessed favorable SNM detection capabilities, it could function as a front-line inspection device, the nuclear-reaction-based DER system of the present invention being used as $2^{nd}$-tier scanner, primarily to resolve false alarms generated by the front-line system. Such combined systems might exhibit considerably enhanced throughput and detection performance than either separately.

2b) In an alternative scenario, the nuclear-reaction-based DER system could serve as front-line scanner, ahead of another system such as, but not limited to, GRA-based explosives detection system (EDS) in accordance with any of the following patents: D. Vartsky, M. B. Goldberg, G. Engler, A. Breskin, A. Goldschmidt, E. Izak and O. Even, "Method and System for Detection of Nitrogenous Explosives by Using Nuclear Resonance Absorption" (U.S. Pat. No. 4,941,162), M. B. Goldberg, D. Vartsky, G. Engler and A. Goldschmidt, "A $^{13}$C Target for Creating 9.17 MeV γ-Radiation for the Detection of a Nitrogenous Material" (U.S. Pat. No. 5,247,177), and Y. Shimoni, D. Vartsky, Y. Shamai and A. Saya, "Method and System for Determining a Lower-Bound Density of a Body" (U.S. Pat. No. 5,125,015).

Since a system based on the present invention will also possess EDS capabilities (simultaneous with SNM detection), by virtue of localizing regions of dense, low-Z material, such combinations could prove of interest when the operational requirements call for detecting both SNM, explosives and (or) other threat objects in the same inspection.

2c) A further possibility would be to operate a system based on the present invention in series or in parallel with some other threat-material detection device or devices, without a defined hierarchy and inspection sequence among the deployed systems being established in advance. Such combinations would, in general, not reduce overall footprint and cost, but may provide the user with added flexibility and sensitivity in countering specific and time-varying threat scenarios.

2d) Finally, the capabilities of a system based on the present invention may be enhanced by exploiting accompanying radiations inherent to the nuclear reaction (primarily neutrons) in order to reveal other physico-chemical characteristics of the threat objects, or of benign materials that generate false-positives in the DER inspection mode. The latter generally pertain, but are not limited to, looking for spontaneous or induced fission processes, delayed characteristic gamma radiation and neutrons, measured in-beam or out-of-beam.

Projected Performance Characteristics:

By way of illustration, the projected performance characteristics are estimated for the $^{11}$B(d,n) reaction.

In-Beam Gamma-Ray Yields from $^{11}$B(d,n)

As can be read off FIG. 5, the 15.09 MeV γ-yield/d at $E_d$=3 MeV is 4.4·10$^{-6}$. In this context, it is noteworthy that the anisotropy of the in-beam 15.09 MeV gamma-rays has been measured and found to exhibit very slight peaking (~10%) at 90° to the beam. Thus, for a 200 μA, 3 MeV d-beam on a thick $^{11}$B target, the 15.09 MeV yield is 5.3·10$^9$/s.

The 4.43 MeV yields are slightly more difficult to estimate, since the $^{12}$C first excited state is populated directly in the (d,n) reaction with a typical 25 mb cross-section (similar to that for the 15.09 MeV state), but is also fed by gamma cascades from higher states. Judging by the spectra in FIGS. 6 and 7 and the limited cross-section data available for the higher states, the 4.43 MeV yield can be conservatively estimated as being the same as the 15.09 MeV yield (in reality, it may be a factor of 2-3 higher).

Detector Counting Rates at Full Transmission (No Absorber)

The counting rates are estimated assuming organic scintillator detector dimensions of 1.5×1.5×40 cm$^3$.

Detector solid angle (1.5×1.5 cm$^2$ cross-section) at 400 cm from target: 1.1·10$^{-6}$ Total intrinsic efficiency (40 cm length): ~0.50 at 15.09 MeV and ~0.69 at 4.43 MeV assumed useful response fraction: ~0.3 at 15.09 MeV and ~0.2 at 4.43 MeV multiplying the latter two entries gives:

Useful intrinsic efficiency: ~15% at 15.09 MeV and ~14% at 4.43 MeV Finally, taking yield×detector-solid-angle× useful-intrinsic-efficiency gives:

Full-transmission counting rates of: 880/s at 15.09 MeV and 810/s at 4.43 MeV

In order to test the performance of the system in this counting-rate régime, detection and identification algorithms along the lines developed for GRA have been applied to synthetic images of an LD-3 aviation container and the expected probabilities of detection and false alarm were determined. Simulations were performed for 2 different cargo contents:

Cargo Content #I

An LD-3 aviation container, uniformly filled with low-Z (organic or aqueous cargo) equivalent to traversing 115 cm of water at every point in the scan (broadly representative of bulk agricultural produce, oil barrels, chemicals, etc.).

Cargo Content #II

An iron slab of dimensions 40×15×15 cm$^3$, weighing ~70 kg (representative of a heavy mechanical part).

Into each cargo type, a cube of SNM (1.5×1.5×1.5 cm$^3$ in dimensions) weighing 65 gr was introduced.

For both these cases, 500 simulated DER scans of the container (each comprising two views at 90° orientation to each other) were generated using the counting-statistics/ pixel corresponding to the calculated 4.43 MeV and 15.09 MeV transmission attenuations through the absorbers in question.

The preliminary analysis performed here follows a procedure along the lines of the one developed for explosives detection via GRA. The estimated DER performance characteristics presented here are based solely on the detection and localization of the suspicious object. Table 2 below presents the results of this simulation.

TABLE 2

| | Simulation results | | | |
|---|---|---|---|---|
| Cargo Content | Assumed Counts/pixel | Detection Probability | False-Alarm Rate | Scan-Time |
| #I | $N_{15.09}$ = 120, $N_{4.43}$ = 30 | >95% | <1% | ~3 min |
| #II | $N_{15.09}$ = 150, $N_{4.43}$ = 150 | >99% | <1% | ~4 min | where $N_{15.09}$ and $N_{4.43}$ are the assumed number of counts/ pixel at the two energies detected after attenuation. Scan-Time depends on the values assumed for $N_{15.09}$ and $N_{4.43}$, on the number of slices (~130) that constitute a full scan of the entire container length and on the unattenuated counting rates quoted above.

It may be possible to enhance specificity to SNM by invoking criteria based on the object density, which is much higher for SNM than for high-Z materials such as Pb or Bi (see FIG. 2 and description above). To achieve such discrimination over voxels of typically 1 cm$^3$, a small number of radiographic views (2-6 or so) of the inspected object will suffice. Following FIG. 8, these could be taken in a single scan with multiple fan beams and detector arrays. It should thus be possible to detect even smaller quantities of SNM than the 65 gr cited above. However, even without this feature, the performance characteristics derived from the simulation are already very promising and in-line with current operational requirements.

Second Embodiment

Out-Of-Beam $^{12}$C(4.43 MeV) Activation Yields

The second embodiment describes in detail Measure #8 mentioned hereinabove, which is an option for scanning limited container regions with particularly clean gamma spectra, making use of in-beam prompt 15.09 MeV and out-of-beam delayed 4.43 MeV γ-rays. This option is based on the same $^{11}$B+d projectile-target system of the first embodiment, but via two different reaction channels.

The following is an explanation of the principal feeding and decay modes underlying the spectral lines observed in FIGS. 6 and 7.

Apart from elastic scattering, the dominant nuclear reaction channels at incident energies $E_d$<~5 MeV are:

$^{11}$B(d,n)$^{12}$C and $^{11}$B(d,p)$^{12}$B for which $T_{1/2}$=20.2 ms

The cross-sections for both (d,n) and (d,p) reaction channels are typically 20-30 mb to each of the energetically-accessible states (including the $^{12}$C 15.09 MeV state). They account for the intensities of the 0.95 & 1.67 MeV ($^{12}$B), 4.43 & 15.09 MeV ($^{12}$C) lines seen in the in-beam spectra of FIGS. 6 and 7.

One notable exception, however, is the cross-section for (d,p) to the $^{12}$B ground-state. There is a major discrepancy regarding its value, as appears in prior art literature, ranging from ~25 mb in the $E_d$=1.0–2.6 MeV range, up to values 10-25 times higher (250-600 mb) at $E_d$=2.6 MeV. Another compilation, the EXFOR (CSISRS) database, quotes a cross-section of 176 mb at $E_d$=3 MeV, decreasing slowly with increasing deuteron energy. Since all excited $^{12}$B states decay to the ground-state within a fraction of a picosecond, the cumulative $^{12}$B production cross-section at each incident energy is the sum of the cross-sections to the individual excited states and the ground state. At $E_d$=3 MeV, four such excited states are energetically accessible (see FIG. 4). Assuming 25 mb to each excited state, the cumulative 12B production cross-section is thus, within the ground-state cross-section discrepancy limits, in the range 100-700 mb.

It is noted that the $^{12}$B ground state decays to the $^{12}$C(4.43 MeV) state with a branch intensity shown in FIG. 4 as 1.3% (the recently-adopted value is 1.23 (5) %). Thus, the $^{11}$B(d, p)$^{12}$B reaction can serve as a generator for 4.43 MeV activation gamma-rays, which may continue to be produced for a few tens of ms after the deuteron beam is switched off, until all $^{12}$B nuclei have decayed. These delayed 4.43 MeV gamma-rays are the basis for Measure #8 hereinabove.

The value of the $^{12}$B production cross-section may determine to a large extent whether the 4.43 MeV yields are sufficient for the present application.

To illustrate this point, Table 3 shows the number of in-beam 15.09 MeV and out-of-beam 4.43 MeV activation gamma-rays produced in a thick $^{11}$B target by a 200 μA beam of 3.0 MeV deuterons. They are respectively calculated for a 20 ms beam-burst, followed by 40 ms with no beam on target, assuming three different values for the $^{12}$B production cross-section, namely: 100 mb (lower limit—column II), 250 mb (intermediate value—column III) and 700 mb (upper limit—column IV).

TABLE 3

Number of gamma-rays produced in (or following) a 20 ms beam burst (parameter - $^{12}$B production cross-section)

| | $\sigma_{prod}(^{12}B)$ = 100 mb | $\sigma_{prod}(^{12}B)$ = 250 mb | $\sigma_{prod}(^{12}B)$ = 700 mb |
|---|---|---|---|
| Prompt 15.09 MeV: beam on (20 ms) $1.1 \cdot 10^8$ | Delayed 4.43 MeV: beam off (40 ms) $3.2 \cdot 10^6$ | Delayed 4.43 MeV: beam off (40 ms) $8.0 \cdot 10^6$ | Delayed 4.43 MeV: beam off (40 ms) $2.2 \cdot 10^7$ |

Clearly, the out-of-beam spectra will be very clean, because there are no delayed gamma-rays at energies above 4.43 MeV. Thus, invoking Measure #8 will furnish an option for measuring both relevant gamma-rays under background-free conditions—the 15.09 MeV line in-beam and the 4.43 MeV line out of beam. The latter are obviously isotropic, being emitted from unoriented nuclei.

However, as evident from Table 3, the out-of-beam yield of the 4.43 MeV gamma-rays is at least a factor of 5 (and maybe even a factor of up to ~35, depending on the $^{12}$B production cross-section) lower than that of the in-beam 15.09 MeV gamma-rays emitted during a single 20 ms beam burst.

Counting-rate estimate: out-of-beam 4.43 MeV gamma-rays (in analogy to the section on in-beam gamma-ray yields from $^{11}$B(d,n))

Assume $\sigma_{prod}(^{12}B)$=250 mb→No. of 4.43 MeV γ-rays in 40 ms for 200 μA of 3 MeV d-beam=8·10$^6$ Detector solid angle (1.5×1.5 cm$^2$ cross-section, 40 cm length) at 400 cm from target=1.1·10$^{-6}$ Useful intrinsic efficiency: (assuming useful response fraction of 30%)=21% we obtain: 1.8 counts per (20+40) ms burst, or 30/s Thus, within the uncertainty limits on $\sigma_{prod}$ ($^{12}$B), we estimate:

Full-transmission out-of-beam 4.43 MeV counting rates of: 12-18%

Thus, in view of the low counting rates expected for out-of-beam 4.43 MeV γ-rays, Measure #8 is likely to be exercised primarily if recourse to a localized scan with ultra-clean spectra (as mentioned above), to confirm the presence of high-Z is indeed required to resolve the issue. In such a case, the localized scan might be performed in discrete stepping motion of the container, the number of 60 ms (20 ms beam-on+40 ms beam-off) cycles, or total time spent at each scan region being determined by the attenuation regime and counting statistics required. Ultimately, the entire process may be automated.

Accelerator and Target Options

Subject to the nuclear reaction chosen, one of the following beams may be used:

| | | |
|---|---|---|
| a. | deuterons: | 100-300 μA of 3-5 MeV |
| b. | $^3$He: | 300-1000 μA of 3-5 MeV |
| c. | protons: | 500-1500 μA of 9-10 MeV |
| d. | mixed d$^+$ & H$_2^+$: | 2000-5000 μA at precisely twice the energy of the 1.75 MeV $^{13}$C(p,γ) capture resonance |

Options a, b & c refer to reactions discussed in the section on Nuclear Reaction Yields, hereinabove, and will not be referred to further here.

Option d might provide a solution for a particular application that calls for detection of high-Z materials and nitrogenous explosives in a single system, or even in the very same scan. In the latter case, one could bombard a thin $^{13}$C layer deposited on the surface of a thick $^{11}$B target, with a mixed mass=2 beam of H$_2^+$ (majority ion) and deuterons (minority ion). The H$_2^+$ molecular ions, when they impinge on the $^{13}$C layer, will break up into two almost parallel, equal-energy protons at the 1.75 MeV resonance, as required for a GRA explosives detection system. Having traversed the $^{13}$C layer, the protons will enter the $^{11}$B target, where they will contribute to high-energy gamma-ray production via the p-capture reaction (see FIG. 5). The deuteron component will traverse the $^{13}$C layer (which will contribute little in the way of reaction yield, the $^{13}$C being thin) and interact with the $^{11}$B target via the (d,n) reaction described above.

Alternately, should it be of interest to configure the high-Z and explosives detection systems around the same accelerator without performing the scans simultaneously, a simpler variant of the above is feasible: one could accelerate mass 2 to the required energy of around 3.5 MeV in the machine, switching between molecular hydrogen and atomic deuterium ions in the ion source (and also changing the respective target) as required by the nature of the application at any given moment.

In terms of accelerator technology, options a, b and c may be realized with virtually any type of machine: cyclotron, radio-frequency-quadrupole (RFQ) or electrostatic (single-stage Van-De-Graaff or two-stage Tandem Van-De-Graaff). Beam current requirements are not excessive for any of these types. In contrast, option d would probably favor an RFQ, as GRA requires considerably higher beam currents.

Any of these options could enhance system performance characteristics (in terms of addressing a broader spectrum of threat objects), as well as improving cost-effectiveness, by sharing a dual-purpose accelerator.

Concerning targets, the requirements of the application are by no means excessive. High-quality and purity $^{11}$B layers (self-supporting, if necessary) have been produced by vacuum-deposition for many years. Moreover, beam-heating problems should not be severe, since boron has an extremely high melting point. As mentioned in the description of the first embodiment, one of the options for reducing the neutron background is to limit the target thickness so that, when the deuteron beam energy is degraded to below the 15.09 MeV yield threshold (at $E_d$=1.6 MeV), the beam emerges from the target and does not produce neutrons at lower bombarding energies. In practical terms, this means that the $^{11}$B layers may be made ~2 mg/cm$^2$ thinner than the full deuteron range in boron (~5.5 mg/cm$^2$, for $E_d$=3 MeV). Doing so will suppress ~30% of the neutrons one would get if the target were thick enough to stop the deuterons (Measure #1 in the section concerning experimental options for ensuring clean in-beam gamma spectra, hereinabove).

The preference for the $^{11}$B(d,n) reaction (as mentioned in the description of the first embodiment) stems from its having the highest yield. However, an ultimate decision as to the optimal reaction may depend not only on its yield, but also on issues such as, but not limited to, contrast-sensitivity, neutron doses to screened items and environment, accelerator complexity and cost, detector cost, etc. The accelerator considerations might eventually favor the p-capture and $^3$He-induced reactions over (d,n), although higher beam currents will be needed to compensate for the lower reaction yields.

In cases where the present DER system is operated in conjunction with other inspection systems, as described hereinabove, it is clear that other considerations may also have a bearing on accelerator specifications, design and performance.

The invention claimed is:

1. A method for detecting substances, the method comprising:
   performing multi-view, multi-energy radiography by irradiating an object with a plurality of discrete, nuclear-reaction-based high-energy gamma-rays at a plurality of different orientations, and detecting and mapping radiation passing through the object with at least one array of detectors;
   indicating the presence of a high-Z substance by detecting a difference in a transmission attenuation characteristic of the high-Z substance as opposed to low-Z and medium-Z substances, and distinguishing a presence of a special nuclear material (SNM) as opposed to a benign, high-Z substance, based on a measurement of the density of the object to be inspected, as derived from said at least one array of detectors.

2. The method according to claim 1, further comprising determining and localizing regions within said object containing the high-Z substance with the multi-view, multi-energy radiography.

3. The method according to claim 1, further comprising determining and localizing regions within said object containing high-density substances with the multi-view, multi-energy radiography.

4. The method according to claim 1, wherein the high-Z substance comprises a special nuclear material (SNM).

5. A system for detecting substances, the system comprising:
   a dual-energy radiography (DER) system comprising a gamma-ray radiation source, including an ion-beam accelerator and a target to which said accelerator sends a beam thereby producing gamma rays, and a plurality of gamma ray detectors or detector arrays positioned to detect gamma ray beams that pass from the gamma-ray radiation source through an object to be inspected, wherein the DER system is adapted to indicate a presence of a high-Z substance, by detecting a difference in a transmission attenuation characteristic of the high-Z substance as opposed to low-Z and medium-Z substances, wherein said DER system distinguishes a presence of a special nuclear material (SNM) as opposed to a benign, high-Z substance, based on a measurement of the density of the object to be inspected, as derived from said plurality of gamma ray detectors or detector arrays.

6. The system according to claim 5, wherein said DER system is adapted to make two measurements of transmission attenuation characteristics one measurement performed at the global absorption minimum for all atomic numbers Z (at approximately 4 MeV photon energy) and another at a higher photon energy.

7. The system according to claim 5, wherein said gamma-ray radiation source comprises a discrete-energy nuclear-reaction-induced source.

8. The system according to claim 5, wherein said gamma-ray radiation source comprises at least one of the target and beam-projectile combinations $^{11}$B+p, $^{11}$B+d, $^{13}$C+$^3$He and $^{10}$B+$^3$He, giving rise to nuclear reactions at beam energies $E_{beam}$<~6 MeV.

9. The system according to claim 5, wherein said gamma-ray radiation source also emits neutrons adapted to enhance SNM detection capability and reduce false-positives.

10. The system according to claim 5, wherein said detectors comprise organic scintillators.

11. The system according to claim 5, wherein said detectors comprise at least one of scintillators with pulse-shape-discrimination properties, an inorganic scintillator spectrometer, and a solid-state radiation spectrometer.

12. The system according to claim 5, wherein said detectors comprise time-of-flight capabilities for suppressing neutron-related spectral background and activation gamma-rays.

13. The system according to claim 5, wherein said beam accelerator system emits ion-beams of d$^+$ at around 3.5 MeV energy, or H$_2^+$ at twice the energy of the 1.75 MeV $^{13}$C(p,$\gamma$) capture resonance, and wherein the DER system is adapted to indicate a presence of the high-Z substance and nitrogenous explosives as a function of the transmission attenuation characteristics of the high-Z substance and the nitrogenous explosives.

14. The system according to claim 13, wherein said beam accelerator system emits mixed ion-beams of d$^+$ and H$_2^+$ at twice the energy of the 1.75 MeV $^{13}$C(p,$\gamma$) capture resonance, and wherein the DER system is adapted to indicate the presence of the high-Z substance and the nitrogenous explosives in the same scan.

15. The system according to claim 13, wherein the DER system is adapted to indicate the presence of the high-Z substance and the nitrogenous explosives in the same scan by bombarding a thin $^{13}$C layer deposited on the surface of a thick $^{11}$B target, with a mixed beam comprising H$_2^+$ and deuterons, both at twice the energy of the 1.75 MeV $^{13}$C(p,$\gamma$) capture resonance.

16. The system according to claim 5, wherein the high-Z substance comprises a special nuclear material (SNM), and the DER system is adapted to distinguish the SNM from at least one of rare-earth elements, transition metals and other stable heavy elements.

17. The system according to claim 5, further comprising a non-DER system for detecting substances in combination with said DER system.

18. The system according to claim 6, wherein one measurement is performed at 4.43 MeV photon energy and another at 15.09 MeV.

19. The method according to claim 1, further comprising making two measurements of transmission attenuation characteristics, one measurement performed at the global absorption minimum for all atomic numbers Z at approximately 4 MeV photon energy and another at a higher photon energy.

20. The method according to claim 19, wherein one measurement is performed at 4.43 MeV photon energy and another at 15.09 MeV.

* * * * *